Patented Aug. 24, 1926.

1,597,425

UNITED STATES PATENT OFFICE.

JACOB BILSKY, OF CHICAGO, ILLINOIS, ASSIGNOR TO A. B. DICK COMPANY, OF CHICAGO, ILLINOIS, A CORPORATION OF ILLINOIS.

STENCIL SHEET AND PROCESS OF PRODUCING THE SAME.

No Drawing. Application filed December 12, 1923. Serial No. 680,272.

In carrying out the invention, I employ an open, porous base, such as the Japanese paper commonly known as "yoshina", and this I provide with a coating which, when applied, is mainly cellulose xanthate or viscose, but which in a short time, due to spontaneous decomposition, regenerates cellulose and cellulose hydrates. The ultimate coating, therefore, consists mainly of these products. They are, however, partially or wholly neutralized and, in addition, modified by treatment with tempering or other agents, which, after the coating has been applied and has set, leaves it in condition for use, as by impressing such coating with the type of a writing-machine. As a neutralizing agent, an organic acid such as butyric or malonic may be used. Such organic acids do not decompose the cellulose xanthate, but, used in excess, precipitate them in an insoluble state, and papers so treated, immediately after the coating is applied, are subject to change on further standing and exposure, due to the spontaneous decomposition of the cellulose xanthates into cellulose and cellulose hydrates. If the neutralization be done with mineral acids, then the cellulose xanthate is immediately converted into cellulose or its hydrates.

In preparing the viscose, I take 100 grams of cotton and soak this for approximately twenty-four hours in 1200 grams of caustic soda solution, such solution containing 18 grams of caustic soda to 100 grams of distilled water. Other caustic alkalis may serve a similar purpose. After such soaking, the cotton is removed from the solution and pressed to expel the surplus moisture until the original 100 grams of cotton, plus a part of the absorbed solution, weighs approximately 300 grams. This cotton is then put in a closed vessel and allowed to stand for forty-eight hours, after which there is added thereto from 60 to 70 grams of carbon-bisulphide. The mass is then stirred or otherwise agitated for a suitable time (four hours will usually be found sufficient), and then 350 grams of a 15% solution of caustic soda are added and the mass allowed to stand for about twelve hours. It is now soluble, and sufficient distilled water is added to dissolve the cotton. Such solution is, of course, alkaline, and, for the purpose of this invention I neutralize (or partially neutralize) the same with an organic acid, such as malic, butyric or malonic acid, of which, when butyric acid is used, I prefer adding from 40 to 50 grams which may be used without causing precipitation of the cotton. The amount of organic acid which may be used at this point and the degree to which the solution may be neutralized depend primarily upon the state or form of the cellulose, that is, whether the $C_6$, $C_{12}$, or $C_{24}$ form. At this stage, the solution is, or should be, of such a consistency as to enable it to be readily taken up by the absorbent yoshino paper. Such consistency may be controlled by the quantum of distilled water added as above described.

In conjunction with the cellulose xanthate, prepared as above described, I employ a tempering agent or agents as above indicated, and this I prefer to prepare and use as a separate bath. Glycerin (30 parts by weight) and distilled water (65 parts by weight) produce good results, although I may, if desired, add a small portion (say 5 parts by weight) of a sulphonated oil such as Turkey red oil. With the tempering solution so formed, I combine a suitable coagulant, for example, 5 parts, by weight, of a commercial 40% solution of formaldehyde.

Highly re-active organic compounds such as aldehydes re-act readily not only with cellulose, but many other substances. The formaldehyde here specified may, therefore, be expected to react not only with the cellulose, but with the various tempering agents used and these reactions may result not only in the combination of the aldehyde with an individual tempering agent, but in the aldehyde combining in such a manner as to cause a union of two or more molecules of any single tempering agent. Equally it may react in such a manner as to cause a union of one tempering agent with another, or of one or more tempering agents with the cellulose and its hydrates. The resulting coagulated coatings, therefore, produced by this process, may not be regarded as an individual chemical substance, but, no doubt, is composed of a large number of substances of widely varying chemical composition, which, however, form a homogeneous mass.

In the production of sheets which are thus coated with a cellulose xanthate solution and a tempering agent or a mixture of tempering agents and an aldehyde or other highly re-active organic substance, the coating becomes almost immediately insoluble in water, while if the reactive substance be omitted, the coating will be water-soluble for a considerable period of time. In fact, this characteristic will persist until by spontaneous change the xanthate reverts to cellulose and its hydrates which are insoluble.

In the coating of the yoshino, the usual process may be followed, that is, the yoshino sheets may be "drawn" over the top of the xanthate solution, thereby becoming thoroughly impregnated, and the excess solution may be removed by withdrawing the coated yoshino from the top of the bath in contact with a wire by means whereof the excess solution will be returned to the bath. The coated sheets may then be hung for a short time (a few hours at ordinary room temperature) to partially dry or set. They may then similarly be "drawn" over the top of the tempering and coagulating solution and again hung to set and so completed ready for practical use.

In the use, as in a writing machine or with a stylus, of a stencil sheet employing the invention herein disclosed, should the coating prove too hard or otherwise resistant to open readily under the applied pressure, to form the desired stencil characters, the surface of the sheet may be moistened, as by water or a solution of water and glycerin, whereupon the coating will be found to respond readily and efficiently to the pressure of the type or stylus.

It is to be understood that the present invention is not limited to what is technically known as cellulose xanthate or viscose, particularly in view of the decomposition of the material so known into cellulose and its hydrates. Accordingly, in the broader claims appended hereto, I shall use the word cellulose as including not only cellulose but also its hydrates and decomposition products, and this regardless of the process by which these may be obtained. Similarly, save where specifically enumerated, the invention is not confined to the particular tempering agents or solution above described. They serve primarily to swell and toughen and prevent or retard the hardening of the cellulose, and it may well be that this or a somewhat similar result may be accomplished by other substances of the same general class. Finally, the invention is not limited to the use of a coagulant in the form of an aldehyde, but embraces other coagulants producing substantially similar results.

Having now described my invention, what I claim is:—

1. In a type-impressible stencil-sheet, a base of open, porous material having a coagulated coating including cellulose.

2. In a type-impressible stencil-sheet, a base of open, porous material having a coagulated coating including cellulose and a tempering agent.

3. In a type-impressible stencil-sheet, a base of open, porous material having a coating including cellulose and an organic compound which will react therewith as a coagulant.

4. In a type-impressible stencil-sheet, a base of open, porous material having a coating including cellulose, an organic compound which will react therewith as a coagulant, and a tempering agent.

5. In a type-impressible stencil-sheet, a base of open, porous material having a coating including cellulose and a highly reactive organic substance which acts as a coagulant.

6. In a type-impressible stencil-sheet, a base of open, porous material having a coating including cellulose, a highly reactive organic substance which acts as a coagulant, and a tempering agent.

7. In a type-impressible stencil-sheet, a base of open, porous material having a coating including cellulose treated with an aldehyde which acts as a coagulant.

8. In a type-impressible stencil-sheet, a base of open, porous material having a coating including cellulose treated with an aldehyde which acts as a coagulant, and a tempering agent.

9. In a type-impressible stencil-sheet, a base of open, porous material having a coating including cellulose, glycerin and a coagulant.

10. In a type-impressible stencil-sheet, a base of open, porous material having a coating including cellulose glycerin, water and a coagulant.

11. In a type-impressible stencil-sheet, a base of open, porous material having a coating including cellulose, glycerin, Turkey red oil and a coagulant.

12. In a type-impressible stencil-sheet, a base of open, porous material having a coating including cellulose, glycerin, Turkey red oil, water and a coagulant.

13. The process of producing a type-impressible stencil-sheet which involves coating an open, porous sheet with a mass containing cellulose and coagulating said mass to reduce its water-solubility.

14. The process of producing a type-impressible stencil-sheet which involves coating an open, porous sheet with a mass containing cellulose and a tempering agent and coagulating said mass to reduce its water-solubility.

15. The process of producing a type-impressible stencil sheet which involves coating an open, porous sheet with a mass containing cellulose and coagulating said mass to render it substantially insoluble.

16. The process of producing a type-impressible stencil-sheet which involves coating an open, porous sheet with a mass containing cellulose and a tempering agent and coagulating said mass to render it substantially water-insoluble.

17. The process of producing a type-impressible stencil-sheet which involves coating an open, porous sheet with cellulose and treating said cellulose with an organic coagulant which will combine therewith.

18. The process of producing a type-impressible stencil-sheet which involves coating an open, porous sheet with cellulose and treating said cellulose with a highly reactive organic coagulant which will combine therewith.

19. The process of producing a type-impressible stencil-sheet which involves coating an open, porous sheet with a mass containing cellulose and treating said mass with an aldehyde coagulant.

20. The process of producing a type-impressible stencil-sheet which involves coating an open, porous sheet with a mass containing cellulose and a tempering agent and treating said cellulose with an aldehyde coagulant.

21. The process of producing a type-impressible stencil-sheet which involves coating an open, porous sheet with a mass containing cellulose rendered substantially water-insoluble by treatment with a highly reactive organic coagulant.

22. The process of preparing a type-impressible stencil-sheet, which consists in coating a base of open material with a water-soluble substance which spontaneously becomes impermeable to ink and subjecting such substance to the action of a coagulant.

23. The process of preparing a type-impressible stencil-sheet, which consists in coating a base of open material with cellulose xanthate and a coagulant.

24. The process of preparing a type-impressible stencil-sheet, which consists in coating a base of open material with cellulose xanthate and an aldehyde which acts as a coagulant.

25. The process of preparing a type-impressible stencil-sheet, which consists in coating a base of open material with cellulose xanthate and formaldehyde.

This specification signed 28th day of November, 1923.

JACOB BILSKY.